May 11, 1965

W. KASTEN ETAL 3,182,800

UNITARY CONTAMINATION SENSITIVE FUSE AND
SEPARATOR ELEMENT ASSEMBLY

Filed Aug. 25, 1960

WALTER KASTEN
RAYMOND L. LANDREE
INVENTORS

BY
William N. Antonis
ATTORNEY.

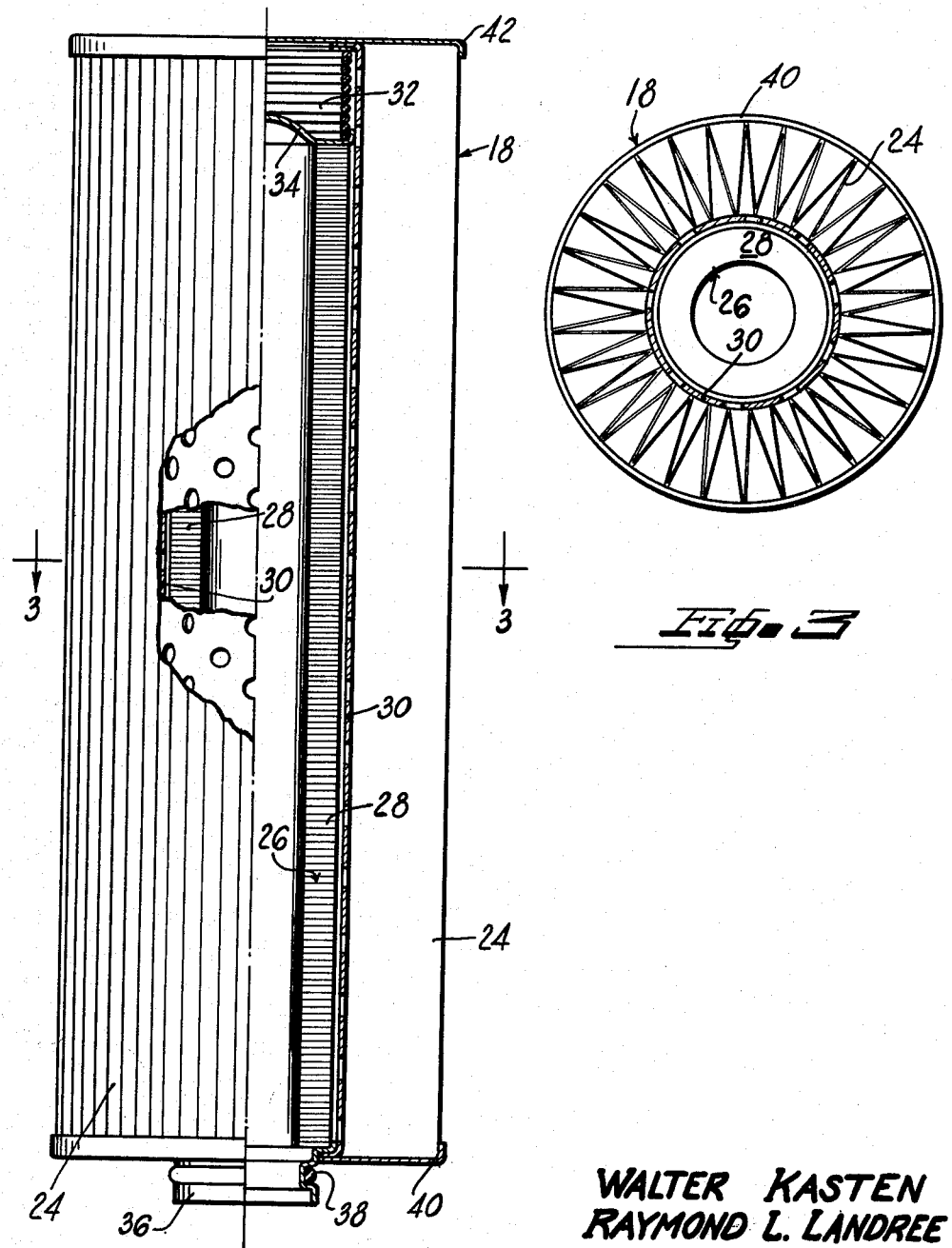

United States Patent Office 3,182,800
Patented May 11, 1965

3,182,800
UNITARY CONTAMINATION SENSITIVE FUSE AND SEPARATOR ELEMENT ASSEMBLY
Walter Kasten and Raymond L. Landree, Madison Heights, Mich., assignors to The Bendix Corporation, Madison Heights, Mich., a corporation of Delaware
Filed Aug. 25, 1960, Ser. No. 51,864
5 Claims. (Cl. 210—96)

This invention relates to a two stage fuel filter water separator and more particularly to a unitary contamination sensitive shut-off fuse and filter separator element assembly for use in the second stage of said fuel filter water separator.

While most fuel used in aircraft is acceptable high quality fuel, presently used refueling equipment is not foolproof. Even though efficient filtration and water separating equipment is installed wherever fuel is transferred from one point to another, so that under normal operating conditions, fuel will be dispensed containing a low solid content and practically no undissolved water content, there is no guarantee that each aircraft, which has been refueled, has acceptable fuel under all conditions and at each refueling.

All filter water separator units are equipped with some type of coalescer and filter separator elements which prevent solid and water contaminants contained in the fuel flowing therethrough from being discharged from the separator unit. In so doing the elements gradually offer increased resistance to fuel flow, due to the retention of contaminants on the surface thereof, until the pressure drop through the element becomes greater than the element strength. If the element is not replaced before this occurs, it will rupture and discharge into the aircraft fuel tanks a large amount of solid and water contaminants. Needless to say, subsequent flights with such contaminated fuel could prove disastrous, since normal airborne filters are designed to remove only small traces of solid contaminants and no water. Large amounts of contaminants will quickly plug up these airborne filters, thus causing the bypass valves in the filters to open. The contaminated unfiltered fuel may then wear out the pumps and plug the servos of the fuel control. Furthermore, any water in the fuel might freeze in the fuel passages and cause a flameout, thereby endangering life and property.

Accordingly, it is an object of this invention to incorporate means within a filter water separator unit which will permit acceptable fuel to be discharged from the unit, but which will prevent unacceptable fuel from being discharged therefrom. Acceptable fuel is normally considered to be fuel with a solids content not over 0.7 mg./liter and no undissolved water.

Another object of this invention is to provide contamination sensitive shut-off means within a filter water separator unit which will stop the discharge of fuel containing unacceptable water concentration levels or unacceptable solid concentration levels, or any combination thereof, said means being capable of handling the full flow of all fuel to be discharged from the unit into an aircraft.

A further object of this invention is to provide contamination sensitive shut-off means within a filter water separator unit which will require no more space or volume than that which is presently available in existing filter water separator units.

A still further object of this invention is to provide contamination sensitive shut-off means within a filter water separator which will stop the flow of contaminated fuel through defective elements, but which will continue to permit the discharge of uncontaminated fuel from the filter water separator unit via the remaining elements which are not defective.

More specifically, it is an object of this invention to provide contamination sensitive shut-off means within a filter water separator unit which includes a plurality of contamination sensitive fuses, at least one of which is operatively connected to each of the second stage separator elements for controlling flow therethrough.

To this end, it is an object of this invention to provide a unitary contamination sensitive fuse and separator element assembly for use in the second stage of a filter water separator unit wherein the contamination sensitive fuse is telescoped within and forms the core of a second stage separator element through which flow is from the outside-in.

Other objects and advantages will become apparent from the following description and accompanying drawings wherein:

FIGURE 2 is a view partially in section and partially broken away of one of the second stage filter separator elements of FIGURE 1; and FIGURE 3 is a sectional view taken along line 3—3 of FIGURE 2.

Figure 1:
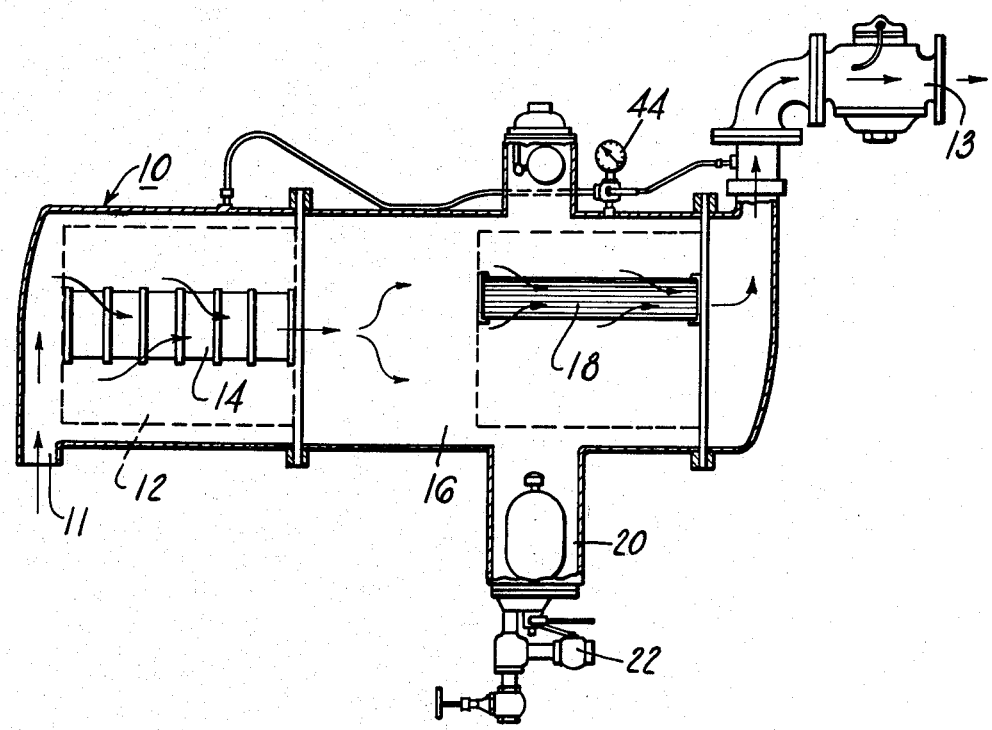
FIGURE 1 is a view partially in section of a filter water separator incorporating our invention.

Numeral 10 of FIGURE 1 indicates a fuel filter water separator which includes an inlet port 11 and an outlet port 13, a first stage 12 containing a plurality of coalescer elements 14 (only one of which is shown) and a second stage 16 containing a plurality of filter separator elements 18 (only one of which is shown). The coalescer elements 14 may include resin bonded densely compressed layers of fine glass fibers and other filter media or any suitable combination of materials capable of normally retaining solid contamination down to a fraction of a micron and coalescing emulsified fuel water mixtures into relatively large droplets of water and clean water-free fuel. These large droplets of water sink to the water sump 20 and also carry with them traces of extremely fine solids. Both the water and the very fine solids are discharged through a float controlled water drain valve 22. Before reaching the outlet port 13 the fuel passes through filter separator elements 18 which prevent the passage of any water droplets and solid contaminants which may have reached these elements. Thus, elements 18 normally only permit the passage of clean water-free fuel therethrough.

However, in order to insure that no contaminated fuel will flow out of outlet port 13, each of the filter separator elements 18 is constructed as shown in FIGURES 2 and 3. Referring to these figures it will be seen that each element includes a resin impregnated pleated paper member 24 and a contamination sensitive shut-off fuse 26, of the type described and claimed in Kasten application Serial No. 39,101, now Patent No. 3,117,925, which is telescoped within the pleated paper member and forms the core thereof. Each fuse 26 includes a porous tubular member 28 consisting of a series of registered face to face contacting layers of resin impregnated material forming pores therebetween. More specifically, such a porous tubular member may be formed out of stacked washer-like elements or a ribbon wound element. It will be noted that the porous tubular member is located within a perforated tube 30 and is placed under a calibrated precompression by a spring 32 which is compressed to its solid height. The spring is located at the closed end of the perforated tube and abuts a movable endplate 34, said endplate being in contact with one end of the porous tubular member 28. A ferrule 36, having an O-ring seal 38 is suitably attached to the other end of the perforated tube 30. The spring 32 need not be compressed to its solid state, if other means are provided to maintain the washers under a given compressive load over and above the compressive force created by the preload of the spring. Endcaps 40 and 42 are suitably attached to the pleated paper member and to the fuse 26 to form an integral filtering unit.

The material of the fuse 26 is treated with an epoxy type resin solution, as described in Kasten application Serial No. 39,101, now Patent No. 3,117,925, so that it is sensitive to predetermined levels of solid and water contaminants. The fuses are inert to minute traces of free water in the fuel flowing therethrough and also allow free passage of extremely fine solid contaminants existing in the fuel, thus giving the fuse a reasonable service life. Larger amounts of water in the fuel will cause the washers to swell and thereby restrict the flow of fuel through the pores of the fuse. Larger dirt particles likewise will restrict flow through the pores since they tend to build upon the outside surface of the porous fuse. Predetermined amounts of water and/or solid contamination will increase the pressure differential through the fuse to thereby create compressive forces at an ever increasing rate until a given magnitude of forces completely stops flow through the pores of the fuse. If desired, a pressure gauge 44 may be suitably attached to the filter water separator to indicate changes in differential pressure within the separator.

Flow in the second stage of the filter water separator will occur first through the pleated paper portion 24 of the filter separator elements, thence through the pores of the fuse 26 to the outlet port 13. So long as the pleated paper member 24 is functioning properly the pressure loss through the fuse will remain substantially constant, since each fuse is absolutely inert to clean fuel containing no undissolved water. When traces of slugs of water or solids in excess of predetermined cleanliness levels pass through a filter separator element 18 and pass through the fuse located downstream and within the element, the fuse will sense the contamination immediately and will register a practically instantaneous increase in pressure drop. This pressure drop, as previously stated, increases because the material of the fuse will swell at water contamination levels above a predetermined value, thereby tending to decrease the pore sizes between the layers of material, and because of blocking of the pores by solid contaminants above a predetermined size. Continued flow of contaminated fuel will result in a complete closing off of the pores so that flow through the fuse will be completely cut off. Accordingly, each fuse will permit acceptable fuel to pass therethrough, but not fuel contaminated with predetermined levels of solids and/or water.

Thus, it can be understood that the utilization of our invention will provide the following and other advantages:

(1) If a single filter separator element fails, only one fuse (the one located within the element) need be replaced, since only the fuse within the defective element would have been subjected to water and/or solid contaminants. If all of the fuses were mounted in a separate housing which received the fuel flow from outlet port 13 or if the fuses were all located in a chamber within the fuel filter water separator, but downstream of the second stage, all of the fuses would have been exposed to the contamination passed by a single defective filter element and would have to be replaced;

(2) The location of a separate fuse within each of the filter separator elements will permit continued operation of the fuel filter water separator even if one or more of the filter separator elements ruptures or otherwise fails, since the fuse takes out of service only the defective elements associated therewith and not the complete fuel filter water separator. Thus, should one or more filter separator elements fail during refueling, safe refueling can be continued at a reduced flow rate proportional to the number of defective elements which are rendered non-functional;

(3) By placing the fuse within each filter separator element no extra space or volume is required for the fuses, since the space within the filter elements is not used;

(4) Locating the fuses, as described and claimed, reduces the amount of hardware required and reduces the overall cost of this type of refueling system; and (5) Maintenance expenses are reduced to a minimum, since only one casing need be serviced and only defective integral filter-fuse units need be replaced.

Those acquainted with this art will readily understand that the invention herein set forth is not necessarily limited and restricted to the precise and exact details presented and that various changes and modifications may be resorted to without departing from the spirit of our invention. Accordingly, we do not desire to be limited to the specific details described herein, primarily for purposes of illustration, but instead desire protection falling within the scope of the appended claims.

Having thus described the various features of the invention, what we claim as new and desire to secure by Letters Patent is:

1. A two stage fuel filter water separator comprising a housing having first, second and third chambers located therein, an inlet port communicating with said first chamber and an outlet port communicating with said third chamber, a plurality of coalescer elements located between said first and second chambers for trapping solid contaminants present in the fuel flowing therethrough from said first to said second chamber and for coalescing any water located in the fuel into relatively large droplets, a plurality of filter elements located between said second and third chambers for trapping any additional solid contaminants present in the fuel flowing therethrough from said second to said third chamber and for preventing flow of any water droplets therethrough, and a plurality of contamination sensitive shut-off fuses responsive to predetermined levels of both solid and water contaminants, one of said fuses being telescoped within each of said filter elements and operatively connected thereto to form integrally removable filter-fuse units, each of said fuses being located downstream of the filter element to which it is operatively connected for receiving at all times the full flow of fuel therefrom and for controlling flow from said element to said third chamber and preventing flow therebetween independently of the flow of fuel from the other of said filter elements when fuel containing said predetermined contamination levels contacts said fuse.

2. In a fuel filter water separator comprising a housing having first and second chambers located therein, an inlet port communicating with said first chamber and an outlet port communicating with said second chamber, a plurality of filter element assemblies located between said first and second chamber for trapping any solid contaminants present in the fuel flowing therethrough from said first to said second chamber and for preventing flow of any water droplets therethrough each of said assemblies including a filter element and a contamination sensitive shut-off fuse responsive to predetermined levels of both solid and water contaminants, said fuse being operatively connected to and located downstream of said filter element for receiving at all times the full flow of fuel therefrom and arranged to form an integrally removable filter-fuse unit for preventing flow therethrough from said first to said second chamber independently of the flow of fuel from the other of said filter element assemblies when fuel containing said predetermined levels of contaminants contacts said fuse.

3. In a fuel filter water separator comprising a housing having first and second chambers located therein, an inlet port communicating with said first chamber and an outlet port communicating with said second chamber, a plurality of filtering units located between said first and second chambers for preventing the flow of solid and water contaminants therethrough, said units each comprising a filtering element and a porous contamination sensitive shut-off fuse telescoped within said filter element in series flow relationship for receiving at all times the full flow of fuel therefrom and operatively connected thereto to form an integral unit, said fuse being sufficiently sensitive to predetermined levels of both solid and water contaminants to cause closure of the pores therein when said predetermined levels are reached thereby rendering the filtering element operatively connected thereto non-functional without affecting continued functioning of the other of said filtering elements.

4. A two stage fuel filter water separator comprising a housing having first, second and third chambers located therein, an inlet port communicating with said first chamber and an outlet port communicating with said third chamber, a plurality of coalescer elements located in said first chamber for trapping solid contaminants present in the fuel flowing therethrough from said first to said second chamber and for coalescing any water located in the fuel into relatively large droplets, a plurality of filter elements located in said second chamber for trapping any additional solid contaminants present in the fuel flowing therethrough from said second to said third chamber and for preventing flow of any water droplets therethrough, and a plurality of contamination sensitive shut-off fuses located in said second chamber, each of which is operatively connected to only one of said filter elements for receiving and controlling the full flow of fuel therefrom independently of the flow of fuel from the other of said filter elements, said fuses each being sufficiently sensitive to predetermined levels of both solid and water contaminants so as to completely prevent flow of fuel from the filter element operatively connected thereto to said third chamber when fuel containing said predetermined contaminant levels contacts the operatively connected fuse.

5. In a fuel filter water separator comprising a housing having first and second chambers located therein, an inlet port communicating with said first chamber and an outlet port communicating with said second chamber, a plurality of filter elements located between said first and second chambers for preventing the flow of solid and water contaminants therethrough, and a plurality of porous contamination sensitive shut-off fuses one of which is telescoped within each of said filter elements in series flow relationship for receiving and controlling the full flow of fuel from the filter element in which it is telescoped independently of the flow of fuel from the other of said filter elements, said fuses each being sufficiently sensitive to predetermined levels of both solid and water contaminants to cause closure of the pores therein and prevent further flow therethrough when said predetermined levels of contaminants are discharged from the filtering element in which it is telescoped.

References Cited by the Examiner
UNITED STATES PATENTS

| 2,597,475 | 5/52 | Grise | 210—23 |
| 2,842,152 | 7/58 | Winter et al. | 137—172 |
| 2,845,080 | 7/58 | Kraft | 137—199 |
| 2,864,505 | 12/58 | Kasten. | |
| 2,929,503 | 3/60 | Ambruster II et al. | 210—120 |
| 3,012,568 | 12/61 | Wooldridge et al. | 137—172 |
| 3,012,569 | 12/61 | Wooldridge et al. | 137—172 |
| 3,034,656 | 5/62 | Kasten | 210—307 |

REUBEN FRIEDMAN, *Primary Examiner.*

HERBERT L. MARTIN, *Examiner.*